United States Patent [19]

Rosthauser et al.

[11] Patent Number: 4,925,885

[45] Date of Patent: May 15, 1990

[54] AQUEOUS COMPOSITIONS FOR USE IN THE PRODUCTION OF CROSSLINKED POLYURETHANES

[75] Inventors: James W. Rosthauser, Dormagen, Fed. Rep. of Germany; Peter H. Markusch, McMurray, Pa.

[73] Assignee: Mobay Corporation, Pittsburgh, Pa.

[21] Appl. No.: 331,333

[22] Filed: Mar. 30, 1989

Related U.S. Application Data

[63] Continuation of Ser. No. 143,082, Jan. 12, 1988, abandoned.

[51] Int. Cl.⁵ ..................... C08L 63/00; C08L 75/04
[52] U.S. Cl. ............................ 523/415; 524/591; 524/539; 524/501; 528/45
[58] Field of Search ............... 523/415; 524/591, 539, 524/501; 528/45

[56] References Cited

U.S. PATENT DOCUMENTS

| | | |
|---|---|---|
| 3,663,652 | 5/1972 | Cannon et al. |
| 3,971,745 | 7/1976 | Carlson et al. ............... 260/29.2 |
| 4,098,933 | 7/1978 | Burkhardt et al. ........... 427/379 |
| 4,284,544 | 8/1981 | Wegner et al. ............... 260/29.2 |
| 4,306,998 | 12/1981 | Wenzel ............................ 528/48 |
| 4,403,085 | 9/1983 | Christenson et al. ............ 528/45 |
| 4,608,413 | 8/1986 | Nachtkamp et al. ............ 524/591 |
| 4,740,496 | 4/1988 | Vanier ........................... 428/423.1 |
| 4,826,894 | 5/1989 | Markusch et al. ............... 523/415 |

*Primary Examiner*—C. Warren Ivy
*Attorney, Agent, or Firm*—Joseph C. Gil; Thomas W. Roy

[57] ABSTRACT

The present invention is directed to an aqueously dispersed, heat-curable coating composition comprising (a) a water dispersible, blocked polyisocyanate containing chemically incorporated anionic hydrophilic groups, at least a portion of which are neutralized with volatile organic compounds, (b) a water dispersible, hydroxyl-terminated polyurethane prepolymer containing chemically incorporated anionic hydrophilic groups, at least a portion of which are neutralized with volatile organic compounds and (c) an epoxy resin which remains stably dispersed in said coating composition.

The present invention is also directed to coatings prepared from the above coating composition.

9 Claims, No Drawings

AQUEOUS COMPOSITIONS FOR USE IN THE PRODUCTION OF CROSSLINKED POLYURETHANES

This application is continuation of application Ser. No. 143,082 filed Jan. 12, 1988, now abandoned.

BACKGROUND OF THE INVENTION

1. Field of the Invention the present invention is directed to aqueously dispersed, heat-curable coating compositions containing water dispersible blocked polyisocyanates, water dispersible hydroxyl-terminated prepolymers and epoxy resins, and to coatings prepared from these compositions.

2. Description of the Prior Art

Mixtures of blocked polyisocyanates and coreactants such as polyhydroxyl compounds are known in the art. For example, U.S. Pat. No. 4,098,933 is directed to the preparation of water dispersible blocked polyisocyanates and to their use as crosslinking agents for other water dispersible coreactants such as polyhydroxyl compounds. U.S. Pat. No. 4,284,544 is directed to compositions containing water dispersible blocked polyisocyanates and polyhydroxyl coreactants which are not dispersible in water. Finally, U.S. Pat. No. 4,608,413 is directed to mixtures of water dispersible blocked polyisocyanate prepolymers and water dispersible polyhydroxyl prepolymers.

It has not been possible to prepare coatings from the above-described aqueous compositions which have good solvent resistant and high hardness values, and yet maintain good impact strength, flexibility and hydrolytic stability. To achieve good solvent resistance and high hardness values, it is necessary for the coatings to have a high crosslink density; however, to achieve the necessary crosslink density, the impact strength and flexibility generally decrease. In order to provide water dispersible blocked polyisocyanate prepolymers and water dispersible hydroxyl-terminated prepolymers suitable for preparing coatings with high crosslink densities, it is necessary to incorporate relatively large amounts of internal emulsifiers which results in coatings with reduced hydrolytic stability.

Accordingly, it is an object of the present invention to provide storage stable aqueous compositions which can be used to prepare coatings having excellent solvent resistance and high hardness as well as good impact strength, flexibility and hydrolytic stability. This object may be achieved according to the present invention which is described hereinafter.

SUMMARY OF THE INVENTION

The present invention is directed to an aqueously dispersed, heat-curable coating composition comprising (a) a water dispersible, blocked polyisocyanate containing chemically incorporated anionic hydrophilic groups, at least a portion of which are neutralized with volatile organic compounds, (b) a water dispersible, hydroxyl-terminated polyurethane prepolymer containing chemically incorporated anionic hydrophilic groups, at least a portion of which are neutralized with volatile organic compounds and (c) an epoxy resin which remains stably dispersed in said coating composition.

The present invention is also directed to coatings prepared from the above coating composition.

DETAILED DESCRIPTION OF THE INVENTION

The water dispersible, blocked polyisocyanates used in conjunction with the water dispersible polyhydroxyl resins and the epoxy resins in the compositions of the present invention preferably contain an average of about 1.1 to 8, preferably about 2 to 6 and most preferably about 2.5 to 4 blocked isocyanate groups per molecule and may be prepared from virtually any organic polyisocyanate, preferably from monomeric diisocyanates or polyisocyanates containing 2 to 4 isocyanate groups. Especially preferred are polyisocyanates having aliphatically- and/or cycloaliphatically-bound isocyanate groups, although polyisocyanates having aromatically-bound isocyanate groups are not excluded and may be used.

The polyisocyanates used for preparing the water dispersible blocked polyisocyanates may be monomeric in nature or adducts prepared from organic diisocyanates and containing carbodiimide, uredione, biuret, allophanate, urea or urethane groups or isocyanurate rings. Suitable polyisocyanates which may be used as such or as intermediates for preparing polyisocyanate adducts include ethylene diisocyanate, 1,4-tetramethylene diisocyanate, 1,6-hexamethylene diisocyanate, 2,4,4-trimethyl-1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-2-isocyanatomethyl cyclopentane, 1-isocyanato-3,3,5-trimethyl-5-isocyanatomethyl cyclohexane, 2,4- and 2,6-hexahydrotoluylene diisocyanate and mixtures of these isomers, 2,4'- and/or 4,4'-dicyclohexylmethane diisocyanate, α, α', α, α'-tetramethyl-1,3- and/or -1,4-xylylene diisocyanate, 1,3 and 1,4-xylylene diisocyanate, 1-isocyanato-1-methyl-4(3)-isocyanatomethyl-cyclohexane, 1,3- and 1,4-phenylene diisocyanate, 2,4- and 2,6-toluylene diisocyanate and mixtures of these isomers, diphenyl methane-2,4'- and/or -4,4'-diisocyanate, naphthalene-1,5-diisocyanate, triphenyl methane-4, 4',4''-triisocyanate, polyphenyl polymethylene polyisocyanates of the type obtained by condensing aniline with formaldehyde followed by phosgenation, and mixtures of the above-mentioned polyisocyanates.

Polyisocyanate adducts containing biuret groups may be prepared from the previously mentioned diisocyanates according to the processes disclosed in U.S. Pat. Nos. 3,124,605: 3,358,010: 3,644,490; 3,862,973; 3,903,126; 3,903,127: 4,051,165: 4,147,714: or 4,220,749 by using coreactants such as water, tertiary alcohols, primary and secondary monoamines, and primary and/or secondary diamines. The preferred diisocyanate to be used in these processes is 1,6-hexamethylene diisocyanate.

Polyisocyanate adducts containing allophanate groups may be prepared by reacting the previously mentioned diisocyanates according to the process disclosed in U.S. Pat. Nos. 3,769,318 and 4,160,080, British Pat. No. 994,890 and German Offenlegungsschrift No. 2,040,645.

Polyisocyanate adducts containing isocyanurate groups may be prepared by trimerizing the previously mentioned diisocyanates in accordance with the processes disclosed in U.S. Pat. Nos. 3,487,080; 3,919,218; 4,040,992: 4,288,586; and 4,324,879: German Auslegeschrift No. 1,150,080: German Offenlegungsschrift No. 2,325,826: and British Pat. No. 1,465,812. The preferred diisocyanates to be used are 2,4-toluylene diisocyanate and/or 2,6-toluylene diisocyanate, 1,6-hexamethylene diisocyanate, isophorone diisocyanate and any mixtures of these diisocyanates.

Polyisocyanate adducts containing urea or preferably urethane groups and based on the reaction product of the previously mentioned diisocyanates and compounds having a molecular weight of less than 400 and containing 2 or more isocyanate-reactive groups may be prepared according to the process disclosed in U.S. Pat. No. 3,183,112. When preparing polyisocyanate adducts using a large excess of diisocyanate, the average isocyanate functionality is determined from the functionality of the compounds containing isocyanate-reactive hydrogens. For example, when an excess of a diisocyanate is reacted with a diol, a polyisocyanate with a functionality of 2 will be produced, while a triol coreactant will result in a polyisocyanate functionality of 3. By using mixtures of compounds containing isocyanate-reactive hydrogens, various functionalities can be obtained. The preferred isocyanate-reactive hydrogens are provided by hydroxyl groups, although amino groups are not excluded. Suitable compounds containing isocyanate-reactive hydrogens are disclosed in U.S. Pat. No. 3,183,112, incorporated herein by reference, and include ethylene glycol, 1,2- and 1,3-propylene glycol, 1,3- and 1,4-butanediol, 1,6-hexanediol, 1,8-octanediol, neopentyl glycol, diethylene glycol, 2-methyl-1,3-propylene glycol, 2,2-dimethyl-1,3-propylene glycol, the various isomeric bis-hydroxymethyl cyclohexanes, 2,2,4-trimethyl-1,3-pentanediol, glycerine, trimethylol propane, ethylene diamine, diethylene triamine, triethylene tetraamine, 1,6-hexanediamine, piperazine, 2,5-dimethyl piperazine, 1-amino-3-aminomethyl-3,5,5-trimethylcyclohexane, bis(4-aminocyclohexyl)methane, bis(4-amino-3-methylcyclohexyl)methane, 1,4-cyclohexanediamine, 1,2-propanediamine, hydrazine, aminoacid hydrazides, hydrazides of semicarbazido carboxylic acids, bis-hydrazides and bis-semicarbazides. 1,3- and 1,4-butanediol, 2,2,4-trimethyl-1,3-pentanediol, trimethylol propane and mixtures thereof are particularly preferred. Preferred diisocyanates are 2,4-toluylene diisocyanate and/or 2,6-toluylene diisocyanate, 1,6-hexamethylene diisocyanate, isophorone diisocyanate and mixtures of these diisocyanates.

It is also possible to use any of the previously described polyisocyanate adducts for the further preparation of polyisocyanate adducts containing urethane or urea groups. Finally, it is possible to prepare the polyisocyanate adducts containing urea or urethane groups from the high molecular weight isocyanate-reactive compounds, preferably polyols, known from polyurethane chemistry and having molecular weights of 400 to about 6,000, preferably 400 to about 3,000.

(1) Examples of the high molecular weight compounds include polyhydroxyl polyesters which are obtained from polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cyclocycloaliphatic, aromatic and/or heterocyclic and they may be unsaturated and/or substituted, e.g. by halogen atoms. Examples of these acids include succinic acid, adipic acid, suberic acid, azelaic acid, sebacic acid, phthalic acid, isophthalic acid, trimellitic acid, phthalic acid anhydride, tetrahydropthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalate and bis-glycol terephthalate. Suitable polyhydric alcohols include the polyhydric alcohols previously set forth for preparing the polyisocyanate adducts containing urea or urethane groups.

(2) Polylactones generally known from polyurethane chemistry, e.g., polymers of caprolactone initiated with the above-mentioned polyhydric alcohols.

(3) Polycarbonates containing hydroxyl groups such as the products obtained from reaction of the polyhydric alcohols previously set forth for preparing the polyisocyanate adducts containing urea or urethane groups, preferably dihydric alcohols such as 1,3-propanediol, 1,4-butanediol, 1,4-dimethylol cyclohexane, 1,6-hexanediol, diethylene glycol, triethylene glycol or tetraethylene glycol with phosgene, diaryl carbonates such as diphenyl carbonate or cyclic carbonates such as ethylene or propylene carbonate. Also suitable are polyester carbonates obtained from the reaction of lower molecular weight oligomers of the above-mentioned polyesters or polylactones with phosgene, diaryl carbonates or cyclic carbonates.

(4) Polyethers include the polymers obtained by the reaction of starting compounds which contain reactive hydrogen atoms with alkylene oxides such as propylene oxide, butylene oxide, styrene oxide, tetrahydrofuran, epichlorohydrin or mixtures of these alkylene oxides. Certain proportions of ethylene oxide may also be included, provided the polyether does not contain more than about 10% by weight of ethylene oxide; however, polyethers which do not contain ethylene oxide are generally used. Suitable starting compounds containing at least one reactive hydrogen atom include the polyols set forth as suitable for preparing the polyisocyanate adducts containing urethane or urea groups and, in addition, water, methanol, ethanol, 1,2.6-hexanetriol, 1,2,4-butanetriol, trimethylol ethane, pentaerythritol, mannitol, sorbitol, methyl glycoside, sucrose, phenol, isononyl phenol, resorcinol, hydroquinone and 1,1,1- or 1,1,2-tris(hydroxylphenyl)ethane. Polyethers which have been obtained by the reaction of starting compounds containing amino groups can also be used, but are less preferred for use in the present invention. Suitable amine starting compounds include those set forth as suitable for preparing the polyisocyanate adducts containing urethane or urea groups and also ammonia, methylamine, tetramethylenediamine, ethanolamine, diethanolamine, triethanolamine, aniline, phenylenediamine, 2,4- and 2,6-toluylenediamine, polyphenylene polymethylene polyamines of the kind obtained by the aniline/formaldehyde condensation reaction and mixtures thereof. Resinous materials such as phenol and cresol resins may also be used as the starting materials. The preferred starting compounds for the polyethers are those compounds which exclusively contain hydroxyl groups, while compounds containing tertiary amine groups are less preferred and compounds containing isocyanate-reactive —NH groups are much less preferred. Polyethers modified by vinyl polymers are also suitable for the process according to the invention. Products of this kind may be obtained by polymerizing, e.g., styrene and acrylonitrile in the presence of polyethers (U.S. Pat. Nos. 3,383,351; 3,304,273; 3,523,095; and 3,110,695: and German Pat. No. 1,152,536). Also suitable as polyethers are amino polyethers wherein at least a portion of the hydroxyl groups of the previously described polyethers are converted to amino groups.

(5) Polythioethers such as the condensation products obtained from thiodiglycol on its own and/or with other glycols, dicarboxylic acids, formaldehyde, amino carboxylic acids or amino alcohols. The products are either polythio mixed ethers, polythio ether esters, or polythioether ester amides, depending on the co-components.

(6) Polyacetals including those obtained from the above mentioned polyhydric alcohols, especially diethylene glycol, triethylene glycol, 4,4'-dioxyethoxy-diphenyldimethylene, 1,6-hexanediol and formaldehyde. also be prepared by the polymerization of cyclic acetals.

(7) Polyether esters containing isocyanate-reactive groups and known in the art.

(8) Polyester amides and polyamides including the predominantly linear condensates obtained from polyvalent saturated and unsaturated carboxylic acids or their anhydrides and polyvalent saturated and unsaturated amino alcohols, diamines, polyamines, or mixtures thereof.

The preferred high molecular weight isocyanate-reactive compounds for use in the process according to the invention are the dihydroxy polyesters, dihydroxy polylactones, dihydroxy polycarbonates and dihydroxy polyester carbonates.

The blocking agents which are suitable for preparing the blocked polyisocyanates are compounds with preferably one isocyanate-reactive group which enter into an addition reaction with an isocyanate group at temperatures above about 50° C., preferably at temperatures in the range of about 60° C. to 100° C., and wherein the resulting addition product liberates the blocking agent at temperatures in the range of about 100° C. to 250° C. Suitable blocking agents of this type include secondary or tertiary alcohols such as isopropanol or tert-butanol; C-H-acidic compounds such as malonic acid dialkyl esters, acetylacetone or acetoacetic acid alkyl esters; oximes such as formaldoxime, acetaldoxime, methyl ethyl ketoxime, cyclohexanone oxime, acetophenone oxime, benzophenone oxime or diethyl glyoxime: lactams such as ε-caprolactam or δ-valerolactam; phenols such as phenol, cresol or nonyl phenol, N-alkyl amides such as N-methyl acetamide; imides such as phthalimide; imidazoles such as benzimidazole: triazoles such as benzotriazole and tolyltriazole: or alkali metal bisulphites.

In order to make the polyisocyanates water dispersible, it is necessary to chemically incorporate hydrophilic groups, i.e., anionic groups, potential anionic groups or optionally nonionic hydrophilic groups, into the polyisocyanate component. Suitable hydrophilic components contain at least one isocyanate reactive group and at least one hydrophilic group or potential hydrophilic group. Examples include aliphatic hydroxy carboxylic acids, aliphatic or aromatic aminocarboxylic acids with primary or secondary amino groups, aliphatic hydroxy sulfonic acids and aliphatic or aromatic aminosulfonic acids with primary or secondary amino groups. These acids preferably have molecular weights below 400. It should be emphasized that the carboxylic acid groups are not considered to be isocyanate-reactive groups due to their sluggish reactivity with isocyanates.

It is also possible to incorporate lateral and/or terminal nonionic hydrophilic groups as a portion of the hydrophilic groups. However, the nonionic hydrophilic groups are less preferred than the anionic groups. Suitable nonionic groups are disclosed in U.S. Pat. No. 4,408,008, herein incorporated by reference, and the related patents discussed therein.

The preferred anionic groups for incorporation into the blocked polyisocyanates in the present introduced by using hydroxy-carboxylic acids of the general formula:

wherein

Q represents a straight or branched, hydrocarbon radical containing 1 to 12 carbon atoms, and x and y represent values from 1 to 3.

Examples of these hydroxy-carboxylic acids include citric acid and tartaric acid.

The preferred acids are those of the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula:

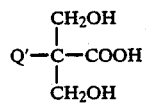

wherein Q' is hydrogen or an alkyl group containing 1 to 8 carbon atoms. The most preferred compound is α-dimethylol propionic acid, i.e, wherein Q' is methyl in the above formula.

In order to prepare water dispersible polyisocyanates containing about 1.1 to 8, preferably about 2 to 6 blocked isocyanate groups per molecule from a difunctional polyisocyanate starting component such as a diisocyanate, it is necessary to use hydrophilic components containing at least two isocyanate-reactive hydrogens. For example, the reaction of an excess of a diisocyanate with a dihydroxy alkanoic acid to provide hydrophilicity results in the linking of 2 diisocyanate molecules and maintains the isocyanate functionality of the molecule at 2. It is more preferred to prepare water dispersible blocked polyisocyanates with a functionality higher than 2. This can be accomplished by using polyisocyanates with a functionality of greater than 2 or by using mixtures of these polyisocyanates with difunctional polyisocyanates as starting materials. In contrast, the reaction of a diisocyanate with a monohydroxy alkanoic acid produces a monoisocyanate. While a small portion of monoisocyanates is acceptable since they may function as cross-linking agents as explained in more detail below, in order to provide higher degrees of cross-linking the isocyanate functionality should preferably be maintained at about 2 to 6.

The above-mentioned acid groups may be converted into hydrophilic anionic groups by treatment with a neutralizing agent such as an alkali metal salt, ammonia, or a primary, secondary or preferably tertiary amine in an amount sufficient to render the blocked polyisocyanates water dispersible. Suitable alkali metal salts include sodium hydroxide, potassium hydroxide, sodium hydride, potassium hydride, sodium carbonate; potassium carbonate, sodium bicarbonate and potassium bicarbonate. The use of alkali metal salts as neutralizing agents is less preferred than the use of volatile organic compounds such as volatile amines since they lead to reduced resistance to water swell in the compositions of the present invention. Therefore, less than 50%, preferably less than 20% and most preferably none of the acid groups should be neutralized with alkali metals.

The preferred volatile amines for neutralizing the acid groups are the tertiary amines, while ammonia and the primary and secondary amines are less preferred. Examples of suitable amines are trimethylamine, triethylamine, triisopropylamine, tributylamine, N,N-dimethyl-cyclohexylamine, N,N-dimethylstearylamine, N,N-dimethylaniline, N-methylmorpholine, N-ethylmorpholine, N-methylpiperazine, N-methylpyrrolidine, N-methylpiperidine, N,N-dimethylethanolamine, N,N-diethylethanolamine, triethanolamine, N-methyldiethanolamine, dimethylaminopropanol, 2-methoxyethyl-dimethylamine, N-hydroxyethylpiperazine, 2-(Z-dimethylaminoethoxy)-ethanol and 5-diethylamino-2-pentanone. The most preferred tertiary amines are those which do not contain isocyanate-reactive groups as determined by the Zerewitinoff test since they are capable of reacting with isocyanate groups during the curing of the compositions of the present invention.

In a preferred embodiment of the present invention volatile tertiary amines are used so that when the water dispersible coating composition of the subject application cures at elevated temperatures, the tertiary amine volatilizes, preferably at a lower temperature than the unblocking temperature of the blocked polyisocyanate, and is removed from the coated substrate. The reformed carboxylic or sulfonic acid groups may then react with the epoxide ring of the epoxy resin component thus generating an additional hydroxyl group for subsequent cross-linking with an isocyanate group which is also generated during the baking process.

In order to prepare the water dispersible blocked polyisocyanate the starting polyisocyanate is preferably reacted at a temperature above about 50° C., preferably at a temperature in the range of about 60° C. to 100° C., with a quantity of blocking agent which corresponds to a ratio of NCO-groups to NCO-reactive groups of about 1:0.3 to 1:0.95, preferably about 1:0.50 to 1:0.85. However, it is also possible in principle to use an excess of blocking agent and to stop the blocking reaction at the required degree of blocking of about 30 to 95%, preferably about 50 to 85%, of the isocyanate groups originally present, by cooling to room temperature. In such a case, the excess blocking agent is generally removed by distillation on completion of the reaction of the partially blocked isocyanate with the hydrophilic components. The blocking reaction is usually carried out in the absence of a solvent. It may be advisable to carry out the blocking reaction in the presence of a catalyst, depending upon the type of blocking agent used. In cases where alcohols are used as blocking agent, it is advisable to use a metal catalyst, for example dibutyl tin dilaurate. In cases where blocking agents containing activated methylene groups are used, it is advisable to use basic catalysts, such as diazabicyclooctane, triethyl amine, alkali metal alcoholates or alkali metal phenolates such as sodium phenolate. The catalysts are used in quantities of about 0.05 to 0.5%, by weight, based on the reaction mixture as a whole.

The free isocyanate groups still present on completion of the blocking reaction are reacted with the hydrophilic components in a second reaction stage. The hydrophilic components are preferably used in such a quantity that there is at least one NCO-reactive group of the hydrophilic components for every isocyanate group still present. Reaction of the partially blocked polyisocyanate with the hydrophilic components may be carried out in the presence or even in the absence of solvents. Suitable solvents include the water-miscible solvents normally used in polyurethane chemistry such as esters, ketones, halogenated hydrocarbons, alkanes and arenes. Low boiling solvents include those boiling at temperatures in the range of about 40° to 90° C. such as acetone and methyl ethyl ketone. In addition, higher boiling solvents such as N-methyl pyrrolidone, dimethyl formamide, dimethyl sulfoxide, propylene glycol monomethyl ether acetate and ethylene glycol mono(-methyl, -ethyl or -butyl) ether acetate may be utilized.

In one embodiment of the process according to the invention, for example, solutions of the partially blocked polyisocyanate and the reaction component containing the hydrophilic group are combined at room temperature or moderately elevated temperature (the hydrophilic component may also be added as such to the solution of the partially blocked polyisocyanate), and kept at a moderately elevated temperature, for example, at a temperature in the range of about 20° to 110° C., until the addition reaction is over. On completion of the reaction, the dissolved end product may either be obtained as such by distilling off the solvent (if a low boiling solvent is present) and any unreacted blocking agent still present, or, if there is no need to remove excess blocking agent, the end product may be converted into an aqueous dispersion by stirring the solution into water and subsequently distilling off the solvent (if a low boiling solvent is present). When higher boiling solvents are used, they are maintained in the end product.

Instead of initially blocking the polyisocyanate component in a first step, it is also possible to initially react the polyisocyanate with the reaction components containing the hydrophilic groups (and optionally with the high molecular weight isocyanate-reactive component when isocyanate-terminated prepolymers are desired). The adduct or prepolymer may then be blocked in a subsequent step as previously described. When low molecular weight polyisocyanate adducts are desired, it is preferred to initially block the polyisocyanate, while when higher molecular weight isocyanate-terminated prepolymers are desired, it is also possible to block the isocyanate groups after reaction with the isocyanate-reactive component containing hydrophilic groups and the high molecular weight isocyanate-reactive component.

The acid groups may be converted into hydrophilic anionic groups by treatment with the alkali during or after the reaction of the hydrophilic component with the blocked polyisocyanate. However, it is preferred to neutralize the acid groups after the reaction of the blocked polyisocyanate with the hydrophilic component and prior to dispersing it in water.

The water dispersible blocked polyisocyanates have a content of blocked isocyanate groups, calculated as NCO, of about 2 to 20%, preferably about 5 to 15% by weight: an average functionality, based on blocked NCO groups, of about 1.1. to 8, preferably about 2 to 6; a content of chemically incorporated anionic groups of about 10 to 180, preferably about 20 to 100 milliequivalents per 100 g of solids: a content of urethane groups, —NH—CO—O—, of about 2 to 30%, preferably about 5 to 20% by weight; and an average molecular weight from about 500 to 10,000, preferably about 1000 to 3000.

The materials to be used for the preparation of the water dispersible, hydroxy-functional prepolymer are the same as those used for the preparation of the water dispersible blocked polyisocyanate with the exception of the blocking agents. In contrast to the blocked polyisocyanates, the water dispersible urethane prepolymers have hydroxyl groups in terminal and/or lateral positions. The type and proportions of the above-mentioned starting materials are therefore selected such that the resulting prepolymers have terminal hydroxyl groups. This component may be produced according to methods known in the art. For example, the above-mentioned reaction components may be added in any sequence. One preferred method comprises introducing all of the isocyanate-reactive components and subsequently adding the polyisocyanate. The number of isocyanate-reactive groups per isocyanate group is maintained at about 1.05:1 to 5:1, preferably about 1.2:1 to 3:1. The mixture is then reacted until no further NCO groups can be detected. As previously discussed for the production of the blocked polyisocyanate, the reaction may take place in the melt or in the presence of organic solvents. In this case the solvents and the reaction temperatures are similar to those used for the production of the blocked polyisocyanate.

The water dispersible, hydroxyl-terminated urethane prepolymer has a content of alcoholic hydroxyl groups of about 0.5 to 10%, preferably about 1 to 5% by weight; an average functionality, based on the hydroxyl groups, of about 1.1 to 8, preferably about 2 to 6; a content of chemically incorporated anionic groups of about 10 to 180, preferably about 20 to 100 milliequivalents per 100 g of solids; a content of urethane groups, NH—CO—O—, of about 2 to 30%, preferably about 5 to 20% by weight; and an average molecular weight of about 500 to 10,000, preferably about 800 to 4,000.

The final component of the aqueous compositions of the present invention is an epoxy resin which is optionally water dispersible and has an average molecular weight of about 150 to 20,000, preferably about 300 to 1500. Suitable epoxy resins include those containing one or more, preferably two or more and most preferably two epoxide groups. The epoxy resins may be prepared from aliphatic, cycloaliphatic or, preferably, aromatic monoalcohols, diols or polyols. Optionally, a non-ionic or an anionic external emulsifier and/or a chemically incorporated non-ionic emulsifier (based on a polyoxyalkylene glycol) or a chemically incorporated anionic emulsifier is used to provide hydrophilicity to the epoxy resin.

Preferred reactants for preparing the epoxy resins are the dihydric phenols which may optionally contain other substituents such as alkyl, aryl, sulphido, sulfonyl, halo, etc. Suitable dihydric phenols include 2,2-bis(4-hydroxylphenyl)propane, 2,2-bis(3-bromo-4-hydroxyphenyl)propane, 2,2-bis(3-chloro-4-hydroxyphenyl)propane, bis(4-hydroxyphenyl)methane, bis(4-hydroxyphenyl)sulfone, bis(4-hydroxyphenyl)sulfide, resorcinol, hydroquinone and the like. The preferred dihydric phenols are 2,2-bis(4-hydroxyphenyl)propane (bisphenol A) and bis(4-hydroxyphenyl)methane for reasons of cost and availability.

The epoxy resins are prepared by reacting the dihydric phenol with a halogen-containing epoxide or a dihalohydrin, especially epichlorohydrin, in the presence of an alkaline medium. By varying the ratios of the dihydric phenol and the epichlorohydrin reactants, different molecular weight products may be obtained as described in U.S. Pat. Nos. 2,582,985; 2,615,007; and 2,633,458.

For purposes of the present invention, optionally at least a portion of the diglycidyl ether of the dihydric phenol component can be replaced with a diglycidyl ether of a hydrogenated dihydric phenol derivative. For example, the diglycidyl ether of the dihydric phenol can have up to essentially 100% of its weight substituted by a diglycidyl alicyclic ether such as 2,2-bis(4-hydroxycyclohexyl)propane or bis(4-hydroxycyclohexyl)methane. Suitable external and chemically incorporated nonionic emulsifiers are disclosed in U.S. Pat. No. 4,522,851 herein incorporated by reference.

Since it is primarily the presence of the epoxide groups and not the length of the backbone connected to these groups which provides the improvements in accordance with the present invention, it is preferred to use low molecular weight epoxides due to their lower melt viscosity such as the diepoxides of low molecular weight hydroxy functional compounds. Aromatic diepoxides such as those based on bisphenol A are most preferred due to their higher reactivity when compared to the aliphatic or cycloaliphatic epoxides. Suitable hydroxyl compounds for preparing the cycloaliphatic epoxides include those previously mentioned and the hydrogenated derivatives of the above-mentioned dihydric phenols, while the aliphatic epoxide resins may be prepared by combining the halogen-containing epoxide or dihalohydrin with any of the low molecular weight chain extenders containing one or more hydroxyl groups previously set forth for the preparation of the polyisocyanate adducts containing urethane or urea groups or the high molecular weight polyether polyols.

Monoepoxides may also be used in accordance with the present invention and include aliphatic, cycloaliphatic or, preferably, aromatic monoepoxides. The monoepoxides may be prepared by reacting the corresponding monoalcohols with a halogen-containing epoxide such as epichlorohydrin.

Other suitable compounds for connecting the epoxide groups can be prepared from compounds containing one or more carboxylic acid groups or their anhydrides, one or more amino groups, dienes and other compounds known in the art. Other suitable epoxy resins include epoxidized fatty acid esters such as epoxidized soybean oil, the cycloaliphatic epoxides disclosed at column 8 of the U.S. Pat. No. 4,212,781 (herein incorporated by reference) and the epoxy resins disclosed at columns 1-3 of U.S. Pat. No. 4,569,951 (herein incorporated by reference).

When the aqueous coating compositions containing epoxy resins are cured at elevated temperature, the epoxide groups react with the potential anionic groups of both the blocked polyisocyanate and the hydroxyl-terminated polyurethane prepolymer and with the anionic groups which have counterions derived from volatile organic compounds. It is believed that the potential anionic groups neutralized with volatile organic compounds are reformed at elevated temperatures. The amount of the epoxy resin is selected such that the minimum equivalent ratio of potential anionic group (i.e. unneutralized acid groups) and anionic groups having counterions derived from volatile organic compounds to epoxide groups is about 0.2, preferably about 0.5 and most preferably about 1.0. The maximum equivalent ratio is about 20.0, preferably about 15.0 and most preferably about 10.0.

The aqueous stoving lacquers of the present invention may be produced by several methods. In accordance with one method when the epoxy resin is either externally emulsified or contains a chemically incorporated emulsifier, each of the individual components are separately dispersed in water and the resulting aqueous dispersions are mixed together. A preferred method for preparing the aqueous compositions is to mix the epoxy resin with either or both of the blocked polyisocyanate component or the hydroxyl-terminated urethane prepolymer and then disperse these components in water. As discussed in U.S. Pat. No. 4,306,998, by proceeding in accordance with this method, it is possible to form a stable aqueous dispersion of the epoxy resin even when using epoxy resins which are neither soluble nor dispersible in water.

The aqueous composition obtained from mixing the blocked polyisocyanate component, the hydroxyl-terminated urethane prepolymer and the epoxy resin should have a solids content of about 2 to 60, preferably about 10 to 40. The aqueous composition should also have a content of about 10 to 180, preferably about 20 to 100 milliequivalents of chemically incorporated anionic groups, preferably carboxylate groups, per 100 g of solids.

The individual components are used in quantities which correspond to an equivalent ratio of blocked isocyanate groups of component (a) to hydroxyl groups of component (b) of about 0.6:1 to 2:1, preferably about 0.9:1 to 1.5:1.

The aqueous coating compositions may be applied to substrates using any of the various techniques known in the art. In addition, the aqueous compositions may be blended with other types of resins optionally containing isocyanate-reactive groups and with amine-or phenol-formaldehyde condensates known in the art. They can also contain pigments, levelling agents, catalysts, and other auxiliaries known in the art. Examples of the application techniques, resins and auxiliaries are set forth in U.S. Pat. No. 4,408,008, which has previously been incorporated by reference.

The invention is further illustrated but is not intended to be limited by the following examples in which all parts and percentages are by weight unless otherwise specified.

EXAMPLES

Example 1

506.5 parts of a 90% solution of the isocyanurate of 1,6-hexamethylene diisocyanate (Desmodur N-3390, Mobay Corp., 19.4% NCO) in a 1:1 mixture of n-butyl acetate and Aromatic 100 (a mixture of aromatic hydrocarbon solvents, Eastman Chem.) were stirred and 150.7 parts of methyl ethyl ketoxime were slowly added with cooling to keep the temperature below 90° C. The mixture was stirred and the temperature was maintained at 90° C. for 0.5 hr. The mixture was cooled to 65° C. and after 30 minutes, α, α-dimethylol propionic acid (42.0 parts) was added with cooling and stirring. The reaction was maintained at 65° C. for 15 min. at which time triethylamine (30.0 parts) was added. After stirring for 30 min., 239.6 parts of N-methyl pyrrolidinone were added. The reaction was stirred overnight, maintaining the temperature at 50° C. An infrared spectrum of the product showed that no residual isocyanate remained.

Based on solid resin:

Average equivalent weight: 390
Blocked NCO content: 11.3%
Carboxylate content: 2.0%
Viscosity: 19,200 mPa.s (22° C.)

For use in coatings formulations, an equal quantity of distilled water was added to the resin, and the dispersion was mixed thoroughly. The pH of the dispersion at 35% solids was then adjusted to 8.3 with triethylamine.
pH: 8.3
Viscosity: 12,400 mPa.s
% Solids: 35

Example 2

A mixture of 244.2 parts of a polyester of phthalic acid and 1,6-hexanediol (molecular weight 2000), 65.5 parts trimethylol propane, 16.4 parts of α, α-dimethylol propionic acid and 173.7 parts of N-methyl pyrrolidinone were heated with stirring to 70° C. To this mixture was added 160.2 parts of bis(4-isocyanatocyclohexyl)methane. The reaction was heated to 105° C. and maintained at that temperature for 5 hr. until no free NCO could be detected by infrared spectrum. The resin was cooled to 70° C. and a mixture of 40 parts of N-methyl pyrrolidinone and 12.4 parts of triethylamine were added.

Based on solid resin:

Average molecular weight: 3979
Average functionality: 6.0
Hydroxyl group content: 2.56%
Urethane group content: 14.8%
Carboxylate group content: 1.1%

712.4 parts of distilled water (preheated to 80° C.) were added to the resin (at 70° C.) with vigorous stirring. The resulting dispersion was heated and stirred for 1 hr. before cooling to ambient temperature.
pH: 7.44
Viscosity: 11 mPa.s (25° C.)
% solids: 35

Example 3

A dispersion was made according to Example 2 with the exception that 244.2 parts of a hexanediol polycarbonate (molecular weight 2000) were substituted for the phthalic acid/1,6-hexanediol polyester.
pH: 7.40
Viscosity: 18 mPa.s (25° C.)
% Solids: 34

Based on solid resin

Average molecular weight: 3979
Average functionality: 6.0
Hydroxyl group content: 2.56%
Urethane group content: 14.8%
Carboxylate group content: 1.1%

Example 4

A mixture of 84.6 parts of a polyester of phthalic acid and 1,6-hexanediol (molecular weight 5.7 parts of neopentyl glycol, 13.7 parts of α, α-dimethylol propionic acid and 54.2 parts of N-methyl pyrolidinone was heated to 70° C. 45.9 parts of bis(4-isocyanatocyclohexyl)methane were then added. The reaction mixture was heated to 110° C. and maintained at that temperature for 4 hr. until no free NCO groups were detected by infrared spectrum. The resin was then cooled to 70° C, and 10.0 parts of N-methyl pyrrolidinone and 7.2 parts of triethylamine were added with stirring.

Based on solid resin:

Average molecular weight: 6000
Functionality: 2.0
Hydroxyl group content: 0.57%
Urethane group content: 13.8%
carboxylate group content: 2.1%

210.7 parts of distilled water (preheated to 80° C.) were added to the resin (at 70° C.) with vigorous stirring. The dispersion was heated at 70° C. and stirred for 1 hour before cooling to ambient temperature.
pH: 6.8
Viscosity: 32 mPa.s (25° C.)
% Solids: 37

Example 5 (Comparison)

388.6 parts of the dispersion from Example 2 were stirred with 226.8 parts of the dispersion from Example 1 and 5 drops of a 5% aqueous solution of a fluorocarbon surfactant (FC-430, 3M Company) until thoroughly mixed. FC-430 is a perfluorinated alkyl-sulfonamido alkyl ester of a polyethylene-proplyene glycol.
pH: 7.3
Viscosity: 22 mPas (25° C.)

This composition was used to make 5 mil (wet film thickness, WFT) drawdowns on steel panels and 10 mil (WFT) films on glass. Most of the solvent was allowed to evaporate for 30 min. at ambient temperature and then the films were baked for 1 hr. at 140° C.

Example 6

250 parts of the coating composition from Example 5 were thoroughly mixed with 15.9 parts of a non-ionic internally emulsified bisphenol A-based epoxy resin dispersion (CMD 35201, Celanese Plastics and Specialities Corporation, 55% solids in water). The epoxy resin dispersion is solvent-free and has a viscosity of 12,000 cps at 25° C. (Brookfield RVT at 10 RPM; because the product is thixotropic, the viscosity readings vary with the spindle speed of the viscometer), a density of 9.2 lbs./gal, an average particle size of 2 and a pH of 7.0. Films were made on glass and steel panels as in Example 5.
pH: 7.3
Viscosity: 71 mPa.s (25° C.)

Example 7 (Comparison) 388.6 parts of the dispersion from Example 3 were thoroughly mixed with 226.8 parts of the dispersion from Example 1 and 5 drops of the fluorocarbon surfactant described in Example 5. Films were made on glass and steel panels as in Example 5.
pH: 7.5
Viscosity: 28 mPa.s (25° C.)

Example 8

250 parts of the formulation from Example 7 were thoroughly mixed with 15.9 parts of the epoxy resins described in Example 6. Films were made on glass and steel panels as in Example 5.
pH: 7.5
Viscosity: 45 mPa.s (25° C.)

Example 9 (Comparison)

33.2 parts of the dispersion from Example 4 were thoroughly mixed with 4.3 parts of the dispersion the fluorocarbon surfactant described in Example 5. Films were made on glass and steel panels as in Example 5.
pH 7.1

Example 10

The undispersed blocked NCO resin from Example was mixed with 10% by weight of a bisphenol A-based diepoxide, (Epon 828, Shell Chemical Corporation, epoxide equivalent weight 185 to 192) until homogeneous. The resin mixture was dispersed with an equal quantity of distilled water. The pH of the dispersion was adjusted to 8.3 with triethylamine.

4.6 parts of the blocked NCO dispersion were then mixed until homogeneous with 33.2 parts of the dispersion from Example 4 and 1.5 parts of a 5% aqueous solution of the fluorocarbon surfactant described in Example 5. Films were made on steel panels and glass as in Example 5.
pH: 7.2

Example 11

01.7 parts of methyl ethyl ketoxime were slowly added to 280.5 parts of the biuret of 1,6-hexamethylene diisocyanate (Desmodur N-3200, Mobay Corporation, 23.1% NCO) while stirring so that the temperature was kept below 90° C. The temperature was 1 maintained at 90° C. for 1 hr., 15 min. Powdered α, α-dimethylol propionic acid (26.1 parts) and N-methyl pyrrolidinone (143.9 parts) were added and the mixture was stirred for 1 hr., 45 min. while maintaining the temperature at 90° C. An infrared spectrum of the product showed that no residual isocyanate remained at this time. The mixture was cooled to 70° C. and 18.7 parts of triethylamine and 39.2 parts of N-methyl pyrrolidinone were added and the temperature was maintained at 70° C. for an additional 15 min. The resulting mixture had a viscosity of 14,800 mPa.s (25° C.).

Based on solid resin:

Average equivalent weight: 350
Blocked isocyanate content: 12.6%
Carboxylate group content: 2.1%

For use in coating formulations, the blocked NCO resin was dispersed in an equal quantity of distilled water at ambient temperature.
pH: 8.7
Viscosity: 11,200 mPa.s (25° C.)
% 35

Example 12 (Comparison)

To 4.3 parts of the dispersion from Example 11 1 were added 33.2 parts of the dispersion from Example 4 and 1.5 parts of a 5% aqueous solution of the fluorocarbon surfactant described in Example 5 and the mixture was thoroughly mixed. Films were made on steel panels and glass as in Example 5.

Example 13

A coating formulation was made according to Example 12 with the exception that an additional 0.2 parts of the 5% aqueous solution of the fluorocarbon surfactant described in Example 5 and 2.4 parts or the epoxy resin from Example 6 were added. The composition was thoroughly mixed and films were made on steel panels and glass as in Example 5.

Example 14

96.9 parts of -caprolactam were added to 225.3 parts of the isocyanurate of 1,6-hexamethylene diisocyanate described in Example 1. The mixture was heated to 90° C. until the exothermic reaction raised the temperature to 108° C. It was then cooled to 90° C. and stirred at that temperature for 40 min. until the theoretical NCO (2.55%) content was attained. 13 4 parts of α,αc-dimethylol propionic acid were added and the mixture was cooled to 70° C. 10.1 parts of triethylamine were added and the mixture was stirred for 70 min. at 70° C. 116.0 parts N-methyl pyrrolidinone were added and then the external heat source was removed. After the product was stirred overnight, no free NCO groups could be detected in an infrared spectrum. The product had a viscosity of 5,600 mPa.s (25° C.).

Based on solid resin:

Average equivalent weight: 365
Blocked NCO content: 11.5%
Carboxylate content: 1.4%

For coatings formulations, an equal quantity of distilled water was added to the resin and the dispersion was stirred until thoroughly mixed.
pH: 8.3
Viscosity: 71 mPa.s (25° C.)
% Solids: 35

Example 15 (Comparison)

To 26.7 parts of the dispersion from Example 14 were added 205.1 parts of the dispersion from Example 4 and 10 drops of a 5% aqueous solution of the fluorocarbon surfactant described in Example 5. The mixture was stirred until thoroughly mixed and films were made on steel panels and glass as in Example 5.
pH: 6.95
Viscosity: 27.5 mPa.s (23° C.)

Example 16

To 25.4 parts of the dispersion from Example 14 were added 195.3 parts of the dispersion from Example 4, 10 drops of a 5% aqueous solution of the fluorocarbon surfactants described in Example 5 and 14.0 parts of the epoxy resin described in Example 6. The mixture was stirred until thoroughly mixed and films were made on glass and steel panels as in Example 5.
pH: 6.94
Viscosity: 31.4 mPa.s (23° C.)

Example 17

To an anhydrous mixture of 13.4 parts of trimethylol propane and 168.0 parts of a polyester of weight 840) preheated to 60° C. were added 222.0 parts of isophorone diisocyanate. The mixture was stirred at 90° C. until the calculated NCO content of 13.5% was attained (3 hr.). 45.2 parts of δ-caprolactam were then added. The temperature of the exothermic reaction rose to about 100° C. The mixture was diluted with 27 parts of N-methyl pyrrolidinone and 40.2 parts of α, α-dimethylol propionic acid were then added. The mixture was stirred for 30 min. at 120° C., and then a further 33.9 g of ε-caprolactam were added and the mixture was again stirred for about 30 minutes at 120° C. until no free NCO be detected in an infrared spectrum. Following the addition of 25.6 parts of N,N-dimethylethanolamine, a highly viscous resin was obtained.

Based on solid resin:

Average molecular weight: 1830
Average functionality: 2.33
Blocked NCO content: 5.4%
Urethane content: 14.0%
Carboxylate group content: 2.4%

918 parts of distilled water (preheated to 90° C.) were added to the resin (at 90° C.) while stirring. A stable, slightly opaque, solution-like dispersion was obtained.
pH: 7.8
Viscosity: 350 mPa.s (25° C.)
% Solids: 35

Example 18

Example 17 was repeated using an additional 7.6 parts of N-methyl pyrrolidinone as solvent. Following the addition of N,N-dimethylethanolamine, the resin was mixed thoroughly and 27.6 parts of the epoxy resin described in Example 10 were added while stirring. 1644.6 parts of distilled water (preheated to 90° C.) were added to the resin (at 90° C.) and the resulting dispersion was stirred for 1 hr. at that temperature before cooling to ambient temperature.
pH: 8.9
Viscosity: 10.5 mPa.s (25° C.)
% Solids: 23

Example 19

25 parts of N-methyl pyrrolidinone, 6.7 parts trimethylol propane and 23.5 parts of α, α,-dimethylol propionic acid were added to 292 parts of an anhydrous polyether of propylene oxide and bisphenol A (OH number, 197, molecular weight,570) The mixture was stirred and heated to 110° C. until clear and then cooled to 80° C. 84 parts of hexamethylene diisocyanate were added and the exothermic reaction raised the temperature of the mixture to 113° C. The mixture was cooled to 100° C. and stirred for 1.5 hr. until no free NCO groups were detectable by infrared spectrum. After adding 13.4 parts of N,N-dimethylethanolamine, a highly viscous hydroxy functional resin was obtained.

Based on solid resin:

Average molecular weight: 1790
Average functionality: 2.22
Hydroxy group content: 2.1%
Urethane content: 14.7%
Carboxylate group content: 1.6%

684.5 parts of distilled water (at 90° C.) were added with stirring to the resin (at 90° C.). The dispersion which was obtained was stable, slightly opaque and solution-like.
pH: 7.2
Viscosity: 90 mPa.s (25° C.)
% Solids: 35

Example 20

Example 19 was repeated using an additional 1.4 parts of N-methyl pyrrolidinone. After the addition of N,N-dimethylethanolamine, the resin was stirred thoroughly. 21.4 parts of the epoxy resin described in Example 10 were then added and the mixture was thoroughly stirred. 792.2 parts of distilled water (preheated to 80° C.) were added to the resin (at 90° C.) and the dispersion was stirred for 1 hr. at that temperature before cooling to ambient temperature.
pH: 7.7

Viscosity: 250 mPa.s (25° C.)
% Solids: 35

Example 21 (Comparison)

A mixture of 74.0 parts of the dispersion from Example 19 and 69.0 parts of the dispersion from Example was stirred thoroughly. A drawdown bar was used to make 10 mil (WFT) films on steel panels and glass. Most of the solvent was allowed to evaporate at ambient temperature and humidity for 30 min. before the films were baked at 180° C. for 30 min.

Example 22

82.5 parts of the dispersion from Example 20 and 69.0 parts of the dispersion from Example 17 were thoroughly mixed. Films were made on steel panels and glass as in Example 21.

Example 23

74 0 parts of the dispersion from Example 19 and 106.5 parts of the dispersion from Example 18 were thoroughly mixed. Films were made on steel panels and glass as in Example 21.

Example 24

82.5 parts of the dispersion from Example and 106.5 parts of the dispersion from Example 18 were thoroughly mixed. Films were made on steel panels and glass as in Example 21.

Example 25

24.2 parts of the dispersion from Example 19 and 22.4 parts of the dispersion from Example 17 were thoroughly mixed with 3.0 parts of the epoxy resin described in Example 6 and 2.6 parts of a 5% aqueous solution of the fluorocarbon surfactant described in Example 5. Films were made on steel panels and glass as in Example 21.

TEST RESULTS (1) All films passed the 180° bend test which involved bending a coated steel panel with the coating on the outside of the bend until the panel was bent 180° and then inspecting the coating for defects.

(2) All films passed the Gardner impact resistance test (ASTM D 3029-84, method G) at 160 in. lb., front and rear.

(3) The pencil hardness (tested according to ASTM D 3363 with a Micrometric Company pencil hardness gauge) was essentially equivalent for comparable films regardless of the presence of epoxy resins.

(4) Hydrolytic stability studies were carried out on Examples 5, 6, 7, 8, 9, 10, 12 and 13 by measuring the tensile properties after hydrolysis aging. Even though slight differences were present, the hydrolytic stability was very good for all samples tested regardless of the presence of epoxy resin. The tensile properties were determined according to ASTM D 638 using a type 4 die. The tests were conducted on free films removed from glass and aged for one or two weeks in an environmental chamber maintained 70° C. at 95% relative humidity prior to testing of the tensile properties.

(5) Solvent resistance (MEK Double Rubs) was measured by wetting a cloth with methyl ethyl ketone and rubbing the cloth across the coating until the coating was removed; each back and forth motion constituting one rub.

TABLE I

SOLVENT RESISTANCE (MEK Double Rubs)

| Example | MEK 2 × Rubs | Comments |
| --- | --- | --- |
| 5 (Comp) | 50 | No epoxy resin added |
| 6 | 100 | Epoxy resin added to blended dispersion |
| 7 (Comp) | 95 | No epoxy resin added |
| 8 | 100 | Epoxy resin added to blended dispersion |
| 9 (Comp) | 20 | No epoxy resin added |
| 10 | 70 | Epoxy resin added to polyisocyanate component |
| 12 (Comp) | 10 | No epoxy resin added |
| 13 | 145 | Epoxy resin added to blended dispersion |
| 15 (Comp) | 70 | No epoxy resin added |
| 16 | 175 | Epoxy resin added to blended dispersion |
| 21 (Comp) | 15 | No epoxy resin added |
| 22 | 65 | Epoxy resin added to polyhydroxyl component |
| 23 | 40 | Epoxy resin added to polyisocyanate component |
| 24 | 85 | Epoxy resin added to both polyhydroxyl and polyisocyanate components |
| 25 | 70 | Epoxy resin added to blended dispersion |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueously dispersed, heat-curable coating composition which comprises
   (a) a water dispersible, blocked polyisocyanate having an average functionality, based on blocked NCO groups, of about 1.1 to 8 and containing
      (i) about 2 to 20% by weight of blocked isocyanate groups, calculated as NCO,
      (ii) about 2 to 30% by weight of urethane groups, calculated as —NH—CO—O—,
      (iii) about 10 to 180 milliequivalents per 100 g of solids of chemically incorporated anionic hydrophilic groups, at least a portion of which are neutralized with volatile organic compounds and
      (iv) optionally chemically incorporated unneutralized acid groups,
   (b) a water dispersible, hydroxyl-terminated polyurethane prepolymer having an average functionality, based on hydroxyl groups, of about 1.1 to 8 and containing
      (i) about 0.5 to 10% by weight of hydroxyl groups,
      (ii) about 2 to 30% by weight of urethane groups, calculated as —NH—CO—O—,
      (iii) about 10 to 180 milliequivalents per 100 g of solids of chemically incorporated anionic hydrophilic groups, at least a portion of which are neutralized with volatile organic compounds and
      (iv) optionally chemically incorporated unneutralized acid groups and
   (c) an epoxy resin which remains stably dispersed in said coating composition and contains one or more epoxide groups,
   components (a) and (b) being present in an amount which corresponds to an equivalent ratio of blocked isocyanate groups of component (a) to hydroxyl groups of component (b) of about 0.6:1 to 2:1 and said epoxy resin being present in an amount such that the equivalent ratio of said unneutralized acid groups and said anionic groups neutralized with volatile organic compounds to epoxide groups is about 0.2:1 to about 20.0:1.

2. The composition of claim 1 wherein said anionic hydrophilic groups comprise carboxylate groups and said volatile organic compounds comprise tertiary amines.

3. The composition of claim 1 wherein said epoxy resin is a hydrophobic epoxy resin which is mixed with said blocked polyisocyanate and/or said hydroxyl terminated polyurethane prepolymer prior to dispersing said mixture in water.

4. The composition of claim 2 wherein said epoxy resin is a hydrophobic epoxy resin which is mixed said blocked polyisocyanate and/or said hydroxyl terminated polyurethane prepolymer prior to dispersing mixture in water.

5. The composition of claim 1 wherein said epoxy resin is a hydrophilically modified epoxy resin.

6. The composition of claim 2 wherein said epoxy resin is a hydrophilically modified epoxy resin.

7. The composition of claim 1 wherein said epoxy resin is a hydrophobic epoxy resin which is stably dispersed using an external emulsifier.

8. The composition of claim 2 wherein said epoxy resin is a hydrophobic epoxy resin which is stably dispersed using an external emulsifier.

9. A coating which is prepared from the coating composition of claim 1.

* * * * *